Patented Mar. 18, 1952

2,589,949

UNITED STATES PATENT OFFICE 2,589,949

CONTROLLING DRILLING FLUID VISCOSITY

Victor G. Meadors, Tulsa, Okla., assignor to Standard Oil Development Company, a corporation of Delaware No Drawing. Application December 15, 1949, Serial No. 133,221

4 Claims. (Cl. 252—8.5)

The present invention concerns the treatment of drilling fluids employed in the drilling of oil and gas wells. More particularly it relates to the use of addition agents adapted to control the viscosity of drilling fluids.

In conventional procedures for drilling oil and gas wells, particularly when the rotary method is employed, it is common practice to circulate around the drill in the bore hole a fluid known as a drilling mud which serves a number of functions, including carrying the bit cuttings out of the bore hole, lubricating the drill pipe and drilling tool, and providing a hydrostatic head in the well to prevent the uncontrolled escape of gases or liquids from various formations encountered during drilling. The drilling mud also serves to form a lining on the wall of the bore hole which helps to prevent the walls of the bore hole from caving and to plug up permeable formations and thereby prevent the flow of fluid from the well bore outwardly into the permeable formations. The normal procedure during drilling is to circulate the mud down through the interior of the drill pipe and then back up to the surface through the annulus between the drill pipe and the wall of the bore hole. The drilling fluid issuing from the well is usually passed over a screen and then through a ditch or trough to a mud pit, to be recirculated through the drill pipe by suitable pumps.

The most common type of drilling mud is essentially a dispersion of a finely divided colloidal material, such as clay, bentonite or the like, in water, together with other materials so that the mud will have the special properties required to perform the several functions enumerated above. The properties of the mud that are of principal concern are viscosity, gel strength, and density. The proper density is necessary to furnish sufficient hydrostatic head in the borehole so that the pressure exerted will exceed that of various fluids encountered in the formations traversed by the borehole. Weighting materials such as silica, iron oxide or barytes, more commonly the latter, are usually added to the drilling mud to impart the proper density. Viscosity and gel strength are imparted by the clay or bentonite component. A typical drilling mud will have a density of from 9 to 18 pounds per gallon and in general, for satisfactory drilling, will have a viscosity below about 60 centipoises at 75° F. as measured on the Stormer viscosimeter at 600 R. P. M.

The gel forming and viscosity characteristics of a drilling fluid are by far the most important. In order to perform the function of carrying cuttings from the drill bit to the earth's surface where the cuttings drop out in the mud pit the drilling fluid must have a selected viscosity such that the fluid may be pumped through the system and also such that the cuttings will remain suspended in the fluid during the flow of the fluid up the bore hole. Also, the fluid, when it is relatively quiescent, should permit the cuttings to fall a few feet since it is essential that the cuttings settle out at the surface. On the other hand, the fluid should have the property of gelling on standing, in order to prevent undue settling of the cuttings in the well itself when drilling and circulation of fluid are temporarily halted. Accordingly, a drilling fluid should be thixotropic, i. e., it should be fluid when subjected to agitation but when standing should set to a gel of sufficient strength to retain cuttings in the time required for the cuttings to settle a few feet.

The properties of a drilling fluid are changed during drilling because the hole traverses strata which are composed of shales, clays, etc., which become dispersed in the fluid. When the strata traversed contain certain clays or such materials as alkaline earth metal compounds, particularly calcium compounds, or when cement is being drilled out, the drilling fluid is liable to become too viscous. In drilling a well in many fields it is necessary to keep a close watch on the drilling fluid and to treat it with chemicals at the surface so as to counteract the effect of contaminants.

One of the most important operations in treating a drilling mud involves the reduction of gel strength and viscosity of the mud. This type of treatment is essential to reduce the load on the pump which circulates the mud and thereby permit the pump to handle more fluid, thus allowing faster drilling of the bore hole. Also, rock cuttings are thus permitted to settle out of the mud relatively rapidly, reducing abrasion on the machinery of the mud circulating system. Similarly, the tendency of the mud to entrain gas is reduced. Many advantages of a mud of the proper viscosity and gel strength will be apparent to those skilled in the art of drilling wells.

Thus it is one object of this invention to provide efficient addition agents for reducing and controlling the viscosity of drilling muds, particularly of those muds in which bentonite is employed as the effective colloidal agent.

A large number of substances have been proposed as viscosity reducing agents for bentonitic drilling fluids. Many of these materials, however, suffer from the disadvantage of being subject to hydrolysis, which reduces their effectiveness. This is particularly true of the alkali metal polyphosphates such as sodium tetraphosphate. Since the products of hydrolysis are relatively ineffective as viscosity reducers, this makes it necessary to repeat the treatment at regular intervals, the frequency of the treatment being governed by the rate of hydrolysis of the treating agent. This continued treatment results in a gradual increase in the concentration of the hydrolysis products. Since the hydrolysis products of many commonly used treating agents are salts, high concentrations of which are effective flocculating agents for clays, a point is soon reached where further treatment is of no value because the effect of the additional treating agent is not sufficient to overcome the flocculating action of the salts already present in the mud. A mud which has been treated to this extent so that it is not susceptible to further treatment is said to be overtreated and presents a serious problem because of the difficulty involved in controlling its properties.

It is thus apparent that there is a need for viscosity reducing agents which will not be subject to hydrolysis, thereby eliminating both the necessity of continually treating the mud and the danger of overtreating. A viscosity reducing additive which may be added to the mud in excess without overtreating has the additional advantage that it may be employed by oil field personnel who normally will not go to the trouble of measuring mud additives accurately.

In accordance with the present invention it has been found that polyether compounds having at least two ether linkages separated by two or more carbon atoms are effective viscosity reducing agents for aqueous drilling fluids of the type employing clay or bentonite. Such ether compounds include cyclic ethers, such as dioxane, as well as ether compounds that may be characterized by the formula

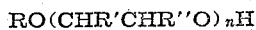

RO(CHR'CHR''O)$_n$H wherein R is selected from the class consisting of hydrogen, alkyl and aryl groups and R' and R'' are selected from the class consisting of hydrogen and alkyl groups and wherein the subscript $n$ is a whole number in the range of 2 to about 100 or more. More specifically, the ether compounds to be employed will be those in which R' and R'' in the above formula are hydrogen atoms and will include among others, the type:

RO(CH$_2$CH$_2$O)$_n$R' where R and R' represent hydrogen, alkyl or aryl groups. Here again the subscript $n$ may vary from 2 to about 100 or more.

Specific examples of ethers which may be used are triethylene glycol, tetraethylene glycol, other polyethylene glycols of 150 to 8000 molecular weight, diethylene glycol diethyl ether and dioxane. Polypropylene glycols and their derivatives may also be used but the polyethylene glycols and their derivatives are preferred.

The use of these ethers as viscosity reducing agents is attended by the following advantages: (1) They are resistant to hydrolysis so that continued treatment is not necessary and the danger of overtreatment is minimized; (2) They are neutral compounds and have relatively little effect on the pH of the suspension; (3) They are non-ionic and will not be precipitated by calcium ions or other inorganic ions commonly encountered in drilling operations.

As a specific example of the viscosity reducing effect of these ethers addition of less than 1% by weight of dioxane to a suspension of 4% of bentonite in water reduced the viscosity of the suspension from 7.2 centipoises to 3.5 centipoises as measured at 75° F. on the Stormer viscosimeter at 600 R. P. M., which is a viscosity reduction of more than 50%.

As a further example of the viscosity reducing effect of the polyethers useful in practicing this invention the following tests were performed. A 4 percent slurry of bentonite in water was prepared and was found to have a viscosity of 7.2 centipoises at 75° F. as measured by the Stormer viscosimeter at 600 R. P. M.

To separate portions of this slurry were added various concentrations of dioxane and to other portions were added various concentrations of several polyethylene glycols of different molecular weights in the range of 300 to 6750. The results obtained are shown in the following table.

*Percentage Reduction in viscosity on adding dioxane and polyethylene glycols to 4% bentonite slurry*

| Additive | Per cent Additive Added ||||
|---|---|---|---|---|
| | 0.2 | 0.4 | 0.6 | 0.16 |
| Dioxane | 20 | 35 | 45 | 65 |
| Polyethylene glycol 300 [1] | 10 | 10 | | |
| Polyethylene glycol 1,450 | 14 | 14 | | |
| Polyethylene glycol 3,350 | 12 | 14 | 15 | |
| Polyethylene glycol 6,750 | 16 | 21 | 23 | 28 |

[1] Indicates approximate molecular weight.

Polyethylene glycols are available commercially and some of them are marketed under the trade name Carbowax.

In practicing the present invention it is contemplated that the polyether compounds be added to the drilling mud in concentrations of about 0.1% to about 10% and preferably in concentration of about 0.1% to about 5%.

It is not intended that the invention be limited by the specific examples given but only by the following claims.

What is claimed is:

1. A drilling fluid comprising an aqueous suspension of a clay and from about 0.1% to about 5% of a polyether having at least two ether linkages separated by at least two carbon atoms, said polyether being selected from the class consisting of dioxane and polyethylene glycols.

2. A drilling fluid comprising an aqueous suspension of bentonite and from 0.1 to 5% of dioxane.

3. A drilling fluid comprising an aqueous suspension of bentonite and from 0.1% to 5% of a polyethylene glycol.

4. Drilling fluid according to claim 3 in which the polyethylene glycol has a molecular weight in the range of 150 to 8000.

VICTOR G. MEADORS.

REFERENCES CITED

The following references are of record in the file of this patent:

UNITED STATES PATENTS

| Number | Name | Date |
|---|---|---|
| 2,423,144 | Gregg | July 1, 1947 |
| 2,425,768 | Wagner | Aug. 19, 1947 |
| 2,431,487 | Larsen | Nov. 25, 1947 |
| 2,436,128 | Twyning et al. | Feb. 17, 1948 |
| 2,510,153 | Swinehart | June 6, 1950 |

OTHER REFERENCES

Brown, A Study of the Effect of NaCMC on Bentonite—Article in World Oil, September 1949, pp. 122 and 124.